(12) United States Patent
Butterfield

(10) Patent No.: US 6,554,534 B1
(45) Date of Patent: Apr. 29, 2003

(54) FLEXIBLE STRUCTURE AND METHOD FOR CONTROLLING THE QUALITY OF LIQUIDS

(76) Inventor: Donal Butterfield, 232 E. 89th St., New York, NY (US) 10128

( * ) Notice: Subject to any disclaimer, the term of this patent is extended or adjusted under 35 U.S.C. 154(b) by 0 days.

(21) Appl. No.: 09/474,808

(22) Filed: Dec. 29, 1999

(51) Int. Cl.⁷ ............................................. E02B 15/04
(52) U.S. Cl. ........................... 405/63; 405/24; 405/26; 405/64
(58) Field of Search ................. 405/15, 16, 17, 405/19, 20, 18, 21, 22, 23, 24, 25, 26, 28, 31, 32, 63, 64, 65, 66, 67, 68, 69, 70, 71, 72, 60, 210

(56) References Cited

U.S. PATENT DOCUMENTS

| | | | | |
|---|---|---|---|---|
| 3,517,513 A | * | 6/1970 | Renshaw ....................... | 405/60 |
| 3,859,796 A | * | 1/1975 | Benson ......................... | 405/64 |
| 4,102,134 A | * | 7/1978 | Margen ........................ | 405/210 |
| 4,252,461 A | * | 2/1981 | Colamussi et al. ........... | 405/64 |
| 4,490,071 A | * | 12/1984 | Morrisroe .................... | 405/24 |
| 4,534,675 A | * | 8/1985 | Morrisroe .................... | 405/63 |
| 5,010,837 A | * | 4/1991 | Hirose .......................... | 405/60 |
| 5,035,536 A | * | 7/1991 | von Winckelmann ........ | 405/60 |
| 5,064,309 A | * | 11/1991 | Dickie et al. ................. | 405/64 |
| 5,102,261 A | * | 4/1992 | Gunderson, III ............. | 405/70 |
| 5,259,696 A | * | 11/1993 | Beardsley .................... | 405/73 |
| 5,294,211 A | * | 3/1994 | Niimura ....................... | 405/27 |
| 5,385,427 A | * | 1/1995 | Kateley et al. ............... | 405/68 |
| 5,547,313 A | * | 8/1996 | Holland ........................ | 405/63 |
| 5,553,972 A | * | 9/1996 | Bergeron et al. ............. | 405/60 |
| 5,591,333 A | * | 1/1997 | Hobin et al. ................. | 405/72 |
| 5,961,251 A | * | 10/1999 | Prendergast .................. | 405/24 |
| 6,089,789 A | * | 7/2000 | Santamaria ................... | 405/63 |

* cited by examiner

Primary Examiner—Frederick L. Lagman
(74) Attorney, Agent, or Firm—Sughrue Mion, PLLC

(57) ABSTRACT

A flexible structure assembled of impermeable modules surrounds a constant volume of liquid so as to control its quality. The modules may join together so that they can adjust to changing water levels. They may have a single layer or an impermeable membrane may sandwich a foamed core. Anchor sacks may hold the structure tightly to the sea bottom, or conventional anchors embedded in the sea bottom may anchor floating structures whose modules close their bottoms. Seals over joints reduce seepage so that conventional filters may clean and treat the liquid. The foamed core modules buoy the structures and insulate against heat transfer. A floating mat of modules comprising flexible transparent membranes may cover the enclosed liquid to prevent heat loss while achieving a solar energy gain. The structure may also be made in one piece from a flexible membrane. The structures are useful for safer bathing, aquaculture, recreational diving, underwater work or exploration, filtering operations and isolating liquids for any other purpose more easily, quickly, cheaply and safely than conventional structures.

12 Claims, 19 Drawing Sheets

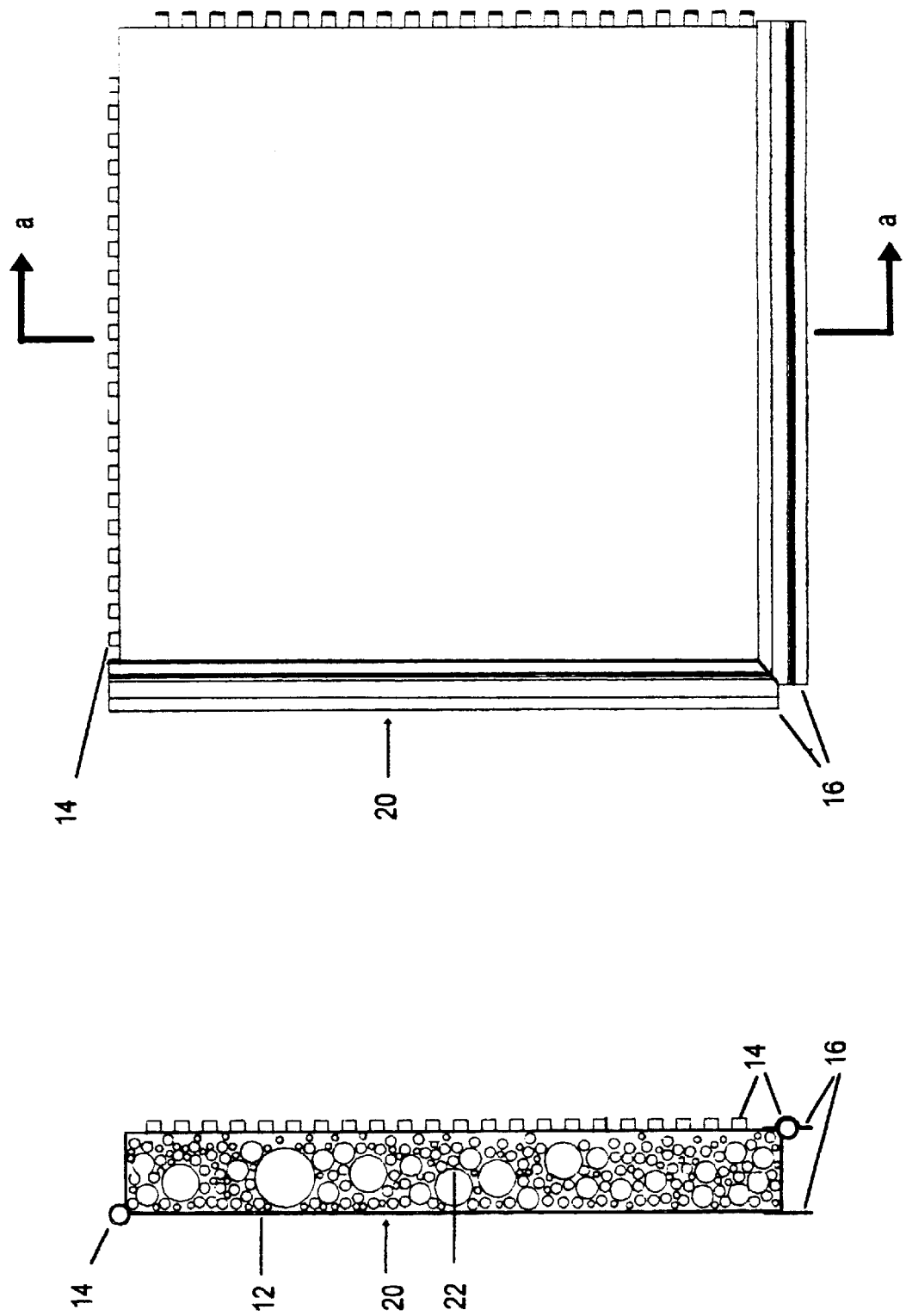

FLEXIBLE STRUCTURE AND METHOD FOR CONTROLLING THE QUALITY OF LIQUIDS

BACKGROUND

1. Field of the Invention

The present invention relates to structures, specifically flexible structures, used to separate and isolate bodies of water or other liquids, in ways to influence and maintain their qualities.

2. Prior Art

Open system fish cultures have used netting supported by buoyant material at their upper edges and anchored to the bottom. These open systems allow the surrounding waters to flow through the cultured species so that the condition of the open water is a determining factor in what happens within the culture. Location is paramount in such fish cultures and limits where they can function successfully.

Furthermore, these cultures pollute surrounding waters with their wastes and fish that escape and breed with wild fish affect the quality of the wild catch. These events have raised the concern of environmentalists and fishermen.

Recreational snorkeling and "scuba" diving are limited to warm weather and clean water, or during winter require expensive travel to, and accommodations in, warm climates with clean water.

To prevent waterborne pollutants from contaminating shorelines, a thick plastic matting was developed and a patent applied for by Gunderboom, Inc. The mattings are buoyed by floats at the upper edge and anchored by weights suspended from the bottom edge. It filters particles and oil based liquids (colloids) in suspension but allows dissolved inorganic and organic material to flow through with the surrounding waters. Thus, it cannot provide insulation against heat transfer, nor unpolluted or clear water. The Gunderboom must be fabricated in a single continuous piece to fit each site. Its matting rips under the repeated impact of wave action. Because it is made from one piece, it is difficult and costly to repair.

Complete isolation of waters have traditionally been accomplished by such civil engineering structures as earth and concrete dams and levees, concrete tank wall dividers and steel sheet piling, all of which resist horizontal forces rigidly. These conventional structures are expensive, take time to build and since they are inflexibly fixed, are difficult to remove. Furthermore, they may be hazardous to boats colliding against them.

Inventors later designed flexible buoyant underwater structures for storage or in which to work. U.S. Pat. No. 3,496,730 to Tsji (1970) discloses a gas filled undersea balloon which directed all forces into tensional stresses aligned with the plane of its surface. The balloon was to be of one piece, designed to resist forces at the particular depth where it would be anchored. U.S. Pat. No. 3,851,487 to Lambertsen (1974) discloses a one piece undersea balloon filled with a liquid whose specific density was lower than the surrounding water, so that it buoyed the balloon upwards from peripheral anchors. The inflated balloon formed a turbidity-free shelter for work underwater. But these structures, like the matted boom, are made from one piece, difficult and costly to repair. Besides the repair problem, each one piece balloon, with its tensional stress equal throughout the entire piece, would need a different thickness to provide enough strength for each depth at which it would be used.

U.S. Pat. No. 3,783,622 to Gambel is directed to a method and system for the containment and salvage of chemicals and oils at sea. This patent discloses a barrier system comprised of a plurality of rigid barrier units hingedly connected together to define an enclosure around a surface area of a body of water. Each barrier unit is provided with adjustable buoyancy and balasting chambers so that a nearly neutral buoyancy condition can be established with substantially all of the mass of the unit below the turbulence level of a body of water in which the barrier unit is placed.

SUMMARY OF THE INVENTION

Specifically, the invention is particularly suitable for isolating near shore bodies of seawater so that they can be filtered efficiently by keeping them from intermingling with the open sea, and heated efficiently by insulating between them and the open sea to reduce heat transfer. The simplicity of the invention and its resistance to tidal, current and wave forces make it practical and economical to operate a closed system for various objects, which include:

1. to provide a barrier against polluted or infested waters so that bathers may swim safely in the protected pure water.

2. to provide an environment for fish culture isolated from the conditions of the surrounding waters.

3. to provide a more suitable environment for work or exploration.

4. to provide a recreational area for diving and other activities in locations unsuitable for them because of climate and/or unsuitable water conditions.

5. to provide a means of isolating from surrounding liquid of differing quality, a body of liquid to accomplish any other purpose.

6. to provide a method of constructing the flexible structure easily, quickly and cheaply.

To accomplish these objectives, the invention has the following advantages:

1. Because it is composed of modules quickly assembled by unskilled labor, it cost much less than conventional structures designed to realize the same objectives.

2. Replacement of and repairs to modules of the structure are easier and cheaper to make than to a conventional monolithic structure.

3. The ease of disassembling the structure makes it easier to secure from government agencies, approvals for its installation and use in near shore bodies of water, than approvals for conventional permanent structures.

4. Because it is formed from an impermeable membrane that does not react with most liquids, it will not deteriorate is chemically due to long exposure in seawater, and so is more durable than conventional concrete and steel structures.

5. Buoyant top modules stretch the structure upward from anchors on the bottom, in tension, a stress easily resisted by a thin membrane.

6. The flexible structure changes form with tidal motion or flooding, so that it eliminates bending stresses. Thin membranes that resist only tension stresses are much cheaper than conventional rigid structures that resist bending stresses.

7. Where repeated reverse bending occurs, hinged joints prevent fatigue failure in the membrane.

8. Since the structure is composed of impermeable modules whose joints are sealed by flaps, liquid cannot pass through in large enough quantities to affect the liquid on the other side. This allows filters to effectively clean and treat the liquid. A conventional structure would require a lining of similar impermeable material.

9. The flexible structure also yields to waves, currents and impact loads, so it converts them into tensile stresses too.

10. The flexible structure is safe for boats and ships navigating around it and for fish enclosed within it, because it yields upon impact.

11. The membrane may insulate against heat transfer. A conventional structure would require an additional lining of similar insulation to reduce heat transfer. Combined with a prior art insulating mat on the surface of the enclosed water, this enables the water to be heated cheaply and efficiently by solar gain to a temperature comfortable for divers when the weather is frigid.

12. Reflective or colored surfaces create illusion of infinite distance in enclosures as if diving under an open sea.

13. Available diving trails in heavily populated areas where climate and water quality are otherwise unsuitable, form a viable and attractive way to dive without spending on travel, so that they will enlarge this increasing market to those less affluent, and extend its seasonal demand to a year round demand.

14. Cheaper quality control of larger bodies of water will incentivate large scale aquaculture by also lowering distribution costs to its nearby market.

Further objects and advantages of the present invention will become apparent from a consideration of the drawings and ensuing description and operation.

BRIEF DESCRIPTION OF THE DRAWINGS

In the drawings, closely related figures have the same number but different alphabetic suffixes.

FIG. 2a is a cross-section along the line 2—2 in FIG. 2b and FIG. 2b is an elevation of a module in another embodiment of the flexible structure, which has a buoyant and insulating a foamed core sandwiched between two layers of an impermeable membrane, sealed together at the edges of the module.

DETAILED DESCRIPTION OF THE INVENTION

This invention is a flexible structure of modular components fabricated from impermeable membranes. They may be joined together in such ways that they can adjust to changing water levels while they isolate constant volumes of water or other liquid so as to control the qualities of the liquids.

Furthermore, the modules may reduce heat transfer, may promote solar energy gain and may have flaps over the joints to reduce seepage or have adhered joints.

The invention may take a wide variety of forms, to maintain a variety of qualities in the liquids being separated and to provide a variety of uses as may be more clearly seen from some examples in the accompanying drawings and their description.

Figure 1B:
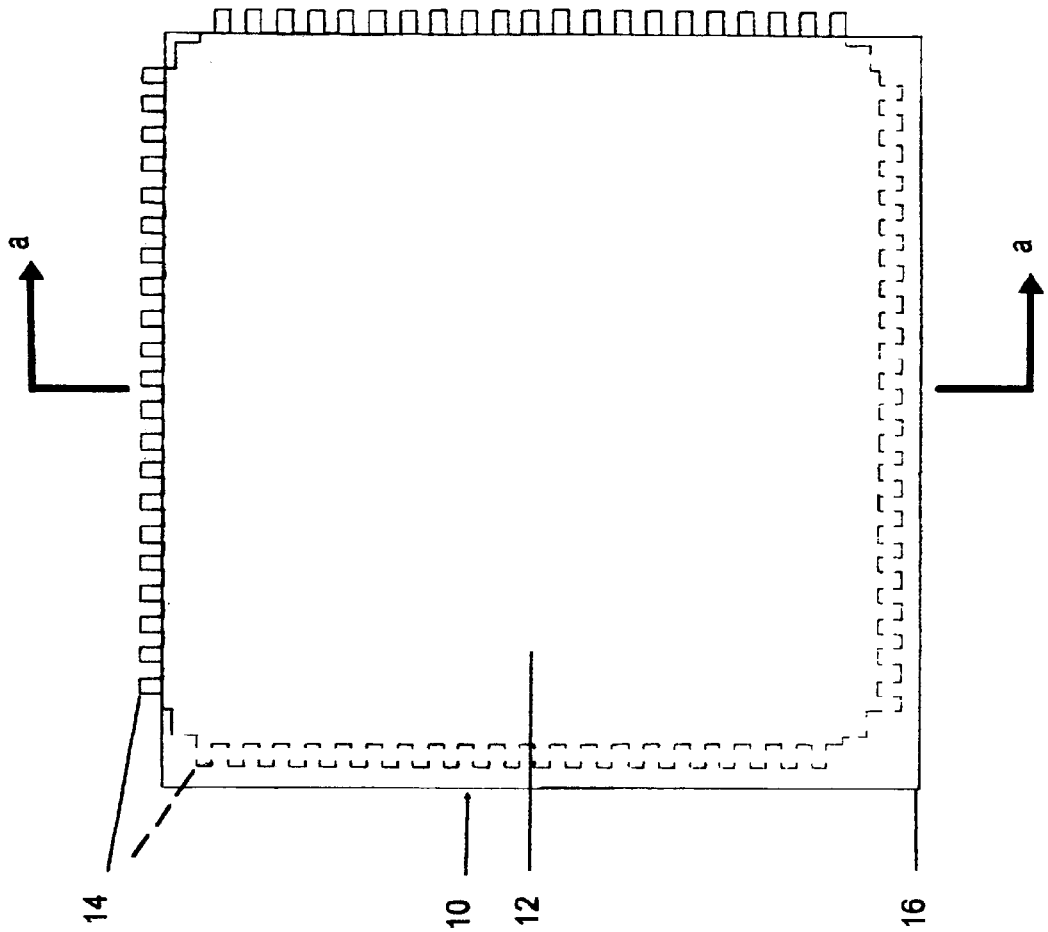
FIG. 1b is an elevation of a modular component of the flexible structure consisting of a layer of an impermeable membrane.
Figure 1A:
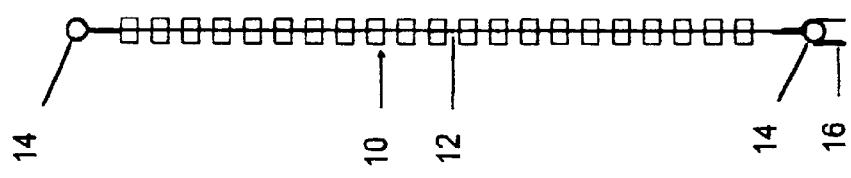
FIG. 1a is a cross-section along the line 1—1 in FIG. 1b

FIGS. 1a and 1b are a cross-section and elevation of a typical embodiment of a modular component of the present invention. They show a single layer 10 square-shaped module consisting of a flexible resilient impermeable membrane 12. Loops 14 on its edges are formed continuously from the same membrane, and seal flaps 16 of the same material are welded, or adhered by a rubber adhesive such as rubatex neoprene, to two adjacent edges.

In the preferred embodiment the membrane 12 is a vulcanized hydrocarbon rubber, such as ethylene propylene rubber (EPDM) reinforced with a high strength silica filament or other non-corrosive fiber strong enough to resist tensile forces without elongating. However, the membrane 12 may consist of any other material that can repeatedly bend and twist without failure, withstand a variety of chemicals and temperature extremes without physical or chemical change, be pigmented or coated with various colors and reinforced with various fibers for specific strength, such as polypropylene, polyethylene, rubber, nylon, vinyl etc. The modules may be made and used in triangles, rectangles or any other shape, size or proportion. They may be pigmented or coated with any color, including reflective finishes.

FIGS. 2a and 2b are a cross-section and elevation of the preferred embodiment. They show a module 20 consisting of a foamed core 22 sandwiched between two layers of the impermeable membrane 12, sealed together at the edges of the module 20, with loops 14 at specific edges, and not at others. Seal flaps 16 are located over specific loops 14, not at others. The reasons for these specific locations will be detailed in following figures and in their operation.

In the preferred embodiment, the foam core 22 is a polystyrene block, foamed with a high volume of air or inert gas for lightness and high resistance to heat transfer, or insulation value. However, the core 22 may consist of any other material, either rigid or flexible, that can retain its large-celled sealed structure without deteriorating or failing due to chemical or physical impact, or the module may have no core 22.

Figure 3A:
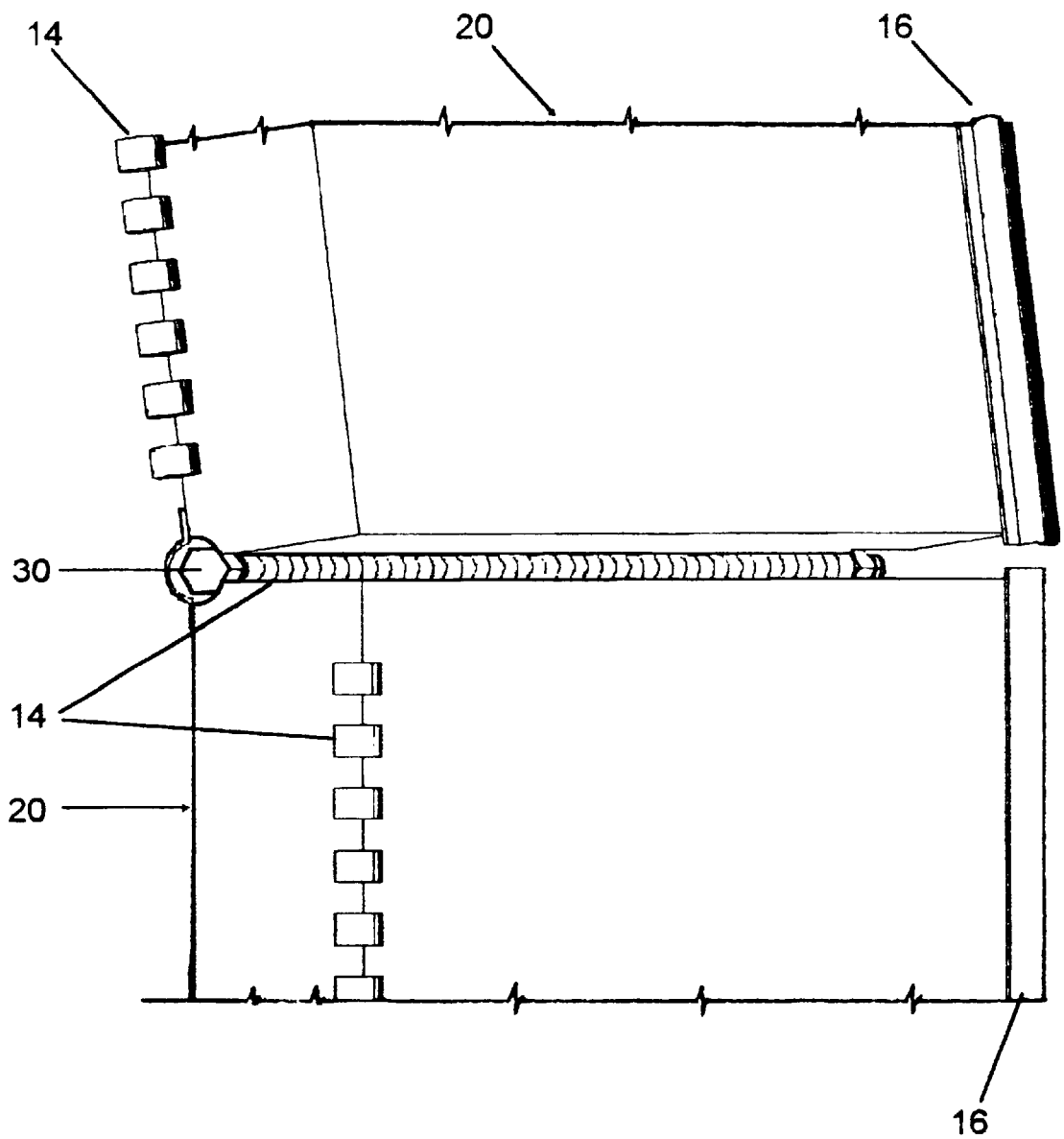
FIGS. 3, 3b and 3c are partial isometric view of joints between two modules.

FIG. 3a is a perspective view of the joint between two modules 20. A gap between the modules allows slight bending on the side without the hinge 30 and complete folding on the side with the hinge 30.

Figure 3B:
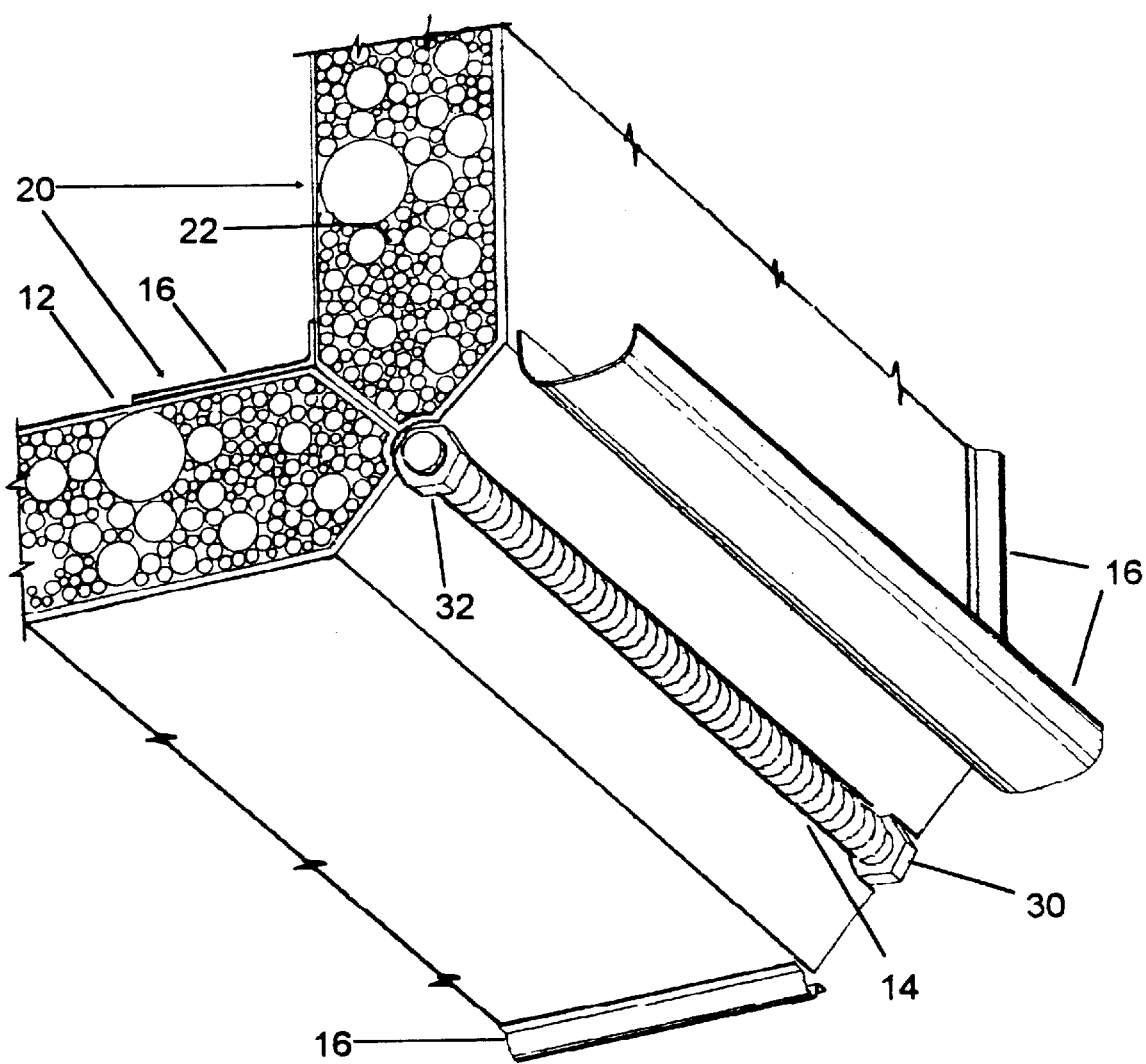

FIG. 3b is a perspective view of the joint between two modules 20 whose ends taper at angles that induce reverse folding at right angles to each other. It shows a hinge pin 30 inserted through their loops 14 and a seal flap 16 on one module 20 covering the joint to reduce seepage. Additional flaps 16 may cover joints on opposite faces without hinges 30, to further reduce seepage. Hinge pins 30 are secured by nuts 32 on one end and bolt heads at the other, clearing the intersection of the joints.

In the preferred embodiment, the hinge pin 30 is a buoyant tube of rigid nylon. However, it may consist of any other non-corrosive, resilient and durable material of adequate rigidity, shearing and being strength, such as wood.

Figure 3C:
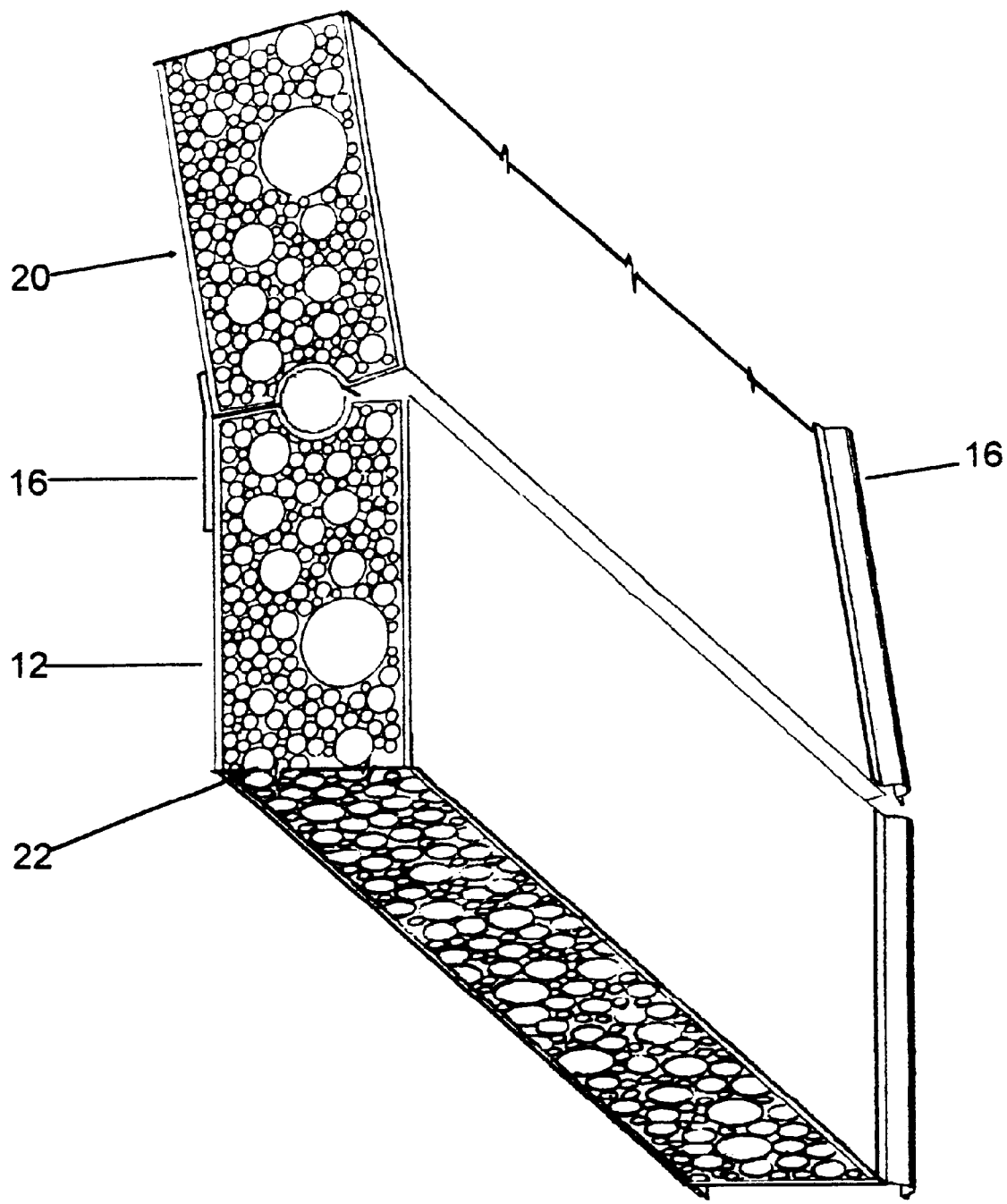

FIG. 3c is a perspective view of a joint between two modules 20 whose ends taper at angles that induce reverse folding into a curved surface that reverses its form.

Figure 4:
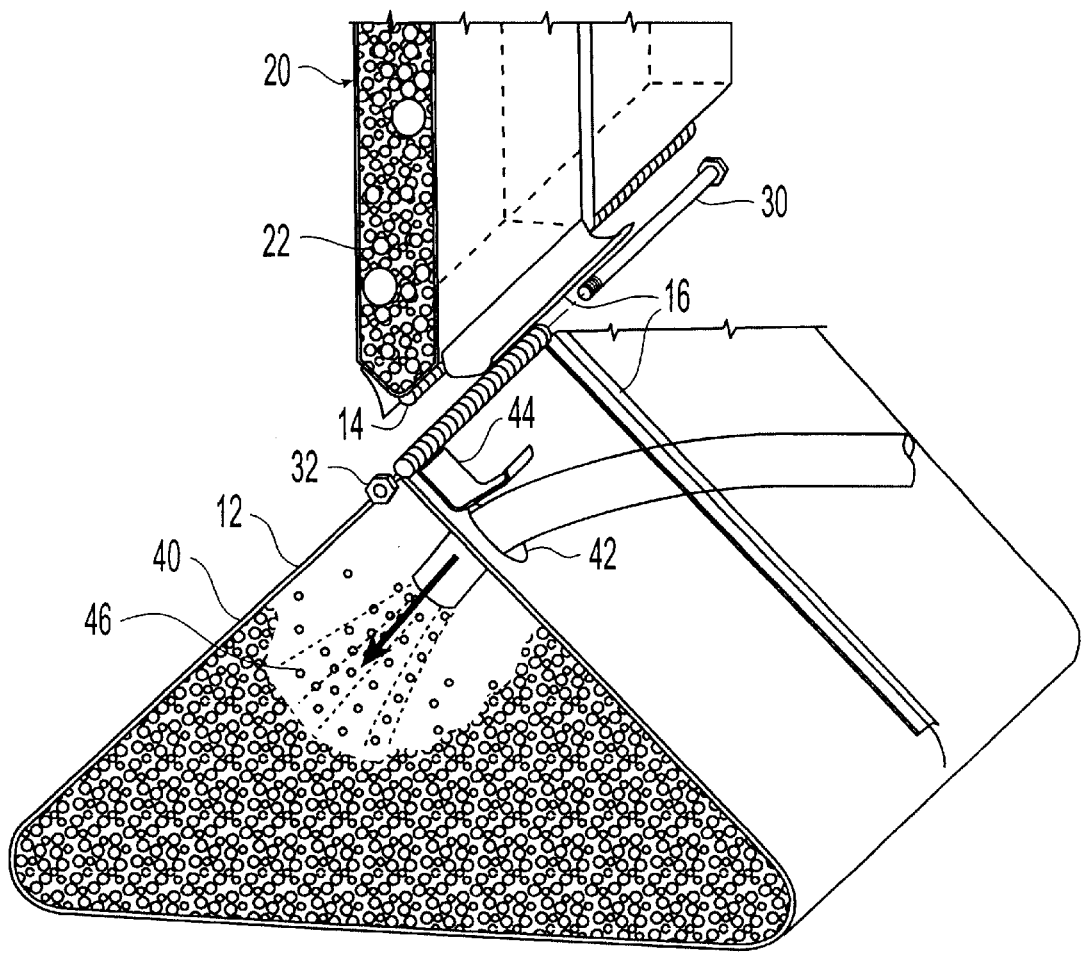
FIG. 4 is an exploded partial isometric view of a module connected to an anchor sack.

FIG. 4 is a perspective view of another embodiment showing a prism-shaped anchor sack 40 formed from the flexible membrane 12 with an exploded view of the connection to module 20. A conventional hose from a submerged pump (not shown) inserted through a hole 42 in the sack 40, pumps in sand and gravel ballast 46 to fill the sack 40 and anchor the strip of modules 20 tightly to the bottom. The anchor 40 is attached by a hinge pin 30 through loops 14 to the adjacent module 20. A flap 16 on the module 20 seals this joint. A flap 16 on one end of the anchor 40 seals the joint to the next anchor 40. Flap 44 is provided to seal the hole 42 in the sack 40.

The modular components 20 are assembled into strips joined by hinges 30 at their edges; and the end module 20 of the strip joined to the anchor sack 40.

Figure 5A:
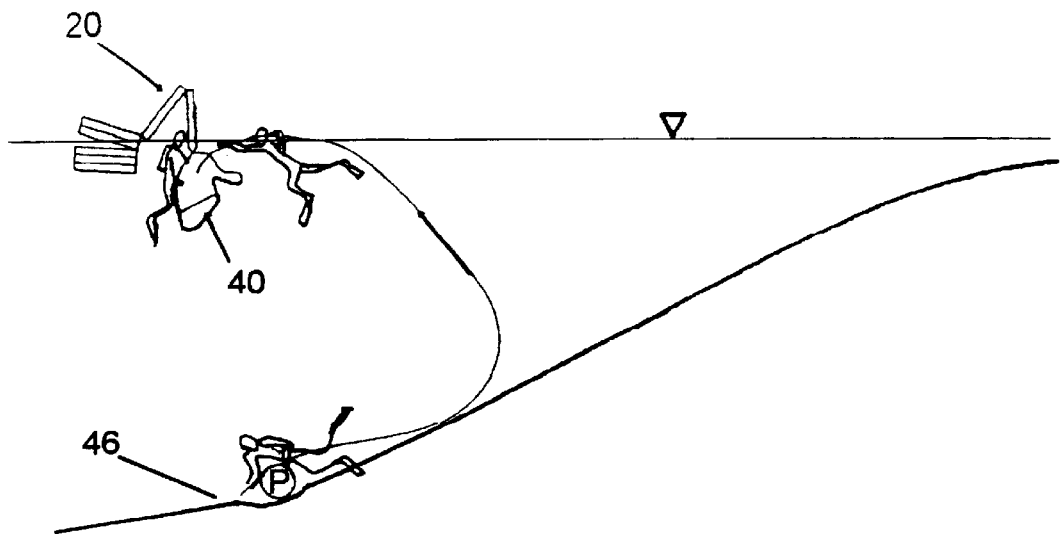
FIGS. 5a and 5b are cross-sections through a near shore body of water showing a method of installing a strip of the flexible structure.

FIG. 5a is a cross-sectional view through a near shore body of water showing divers using a pump P to begin pumping beach sand 46 into an anchor sack 40 attached to a strip of assembled modules 20 that they have floated over position on site.

Figure 5B:
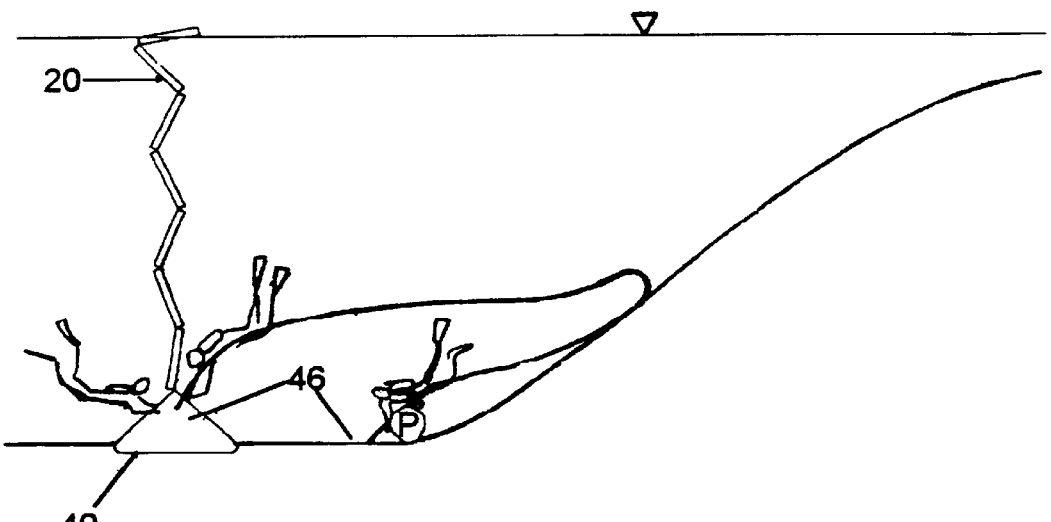

FIG. 5b shows the same divers guiding the gradually sinking anchor 40 into the exact position on the bottom with the strip now stretching upwards from it towards the surface. The module 20 at the upper end consists of a buoyant foamed core 22 sandwiched between two flexible membranes 12 so that it stretches the strip upward from the anchor 40 on the bottom. Each module 20 in the strip may contain such a buoyant foamed core 22.

Figure 6:
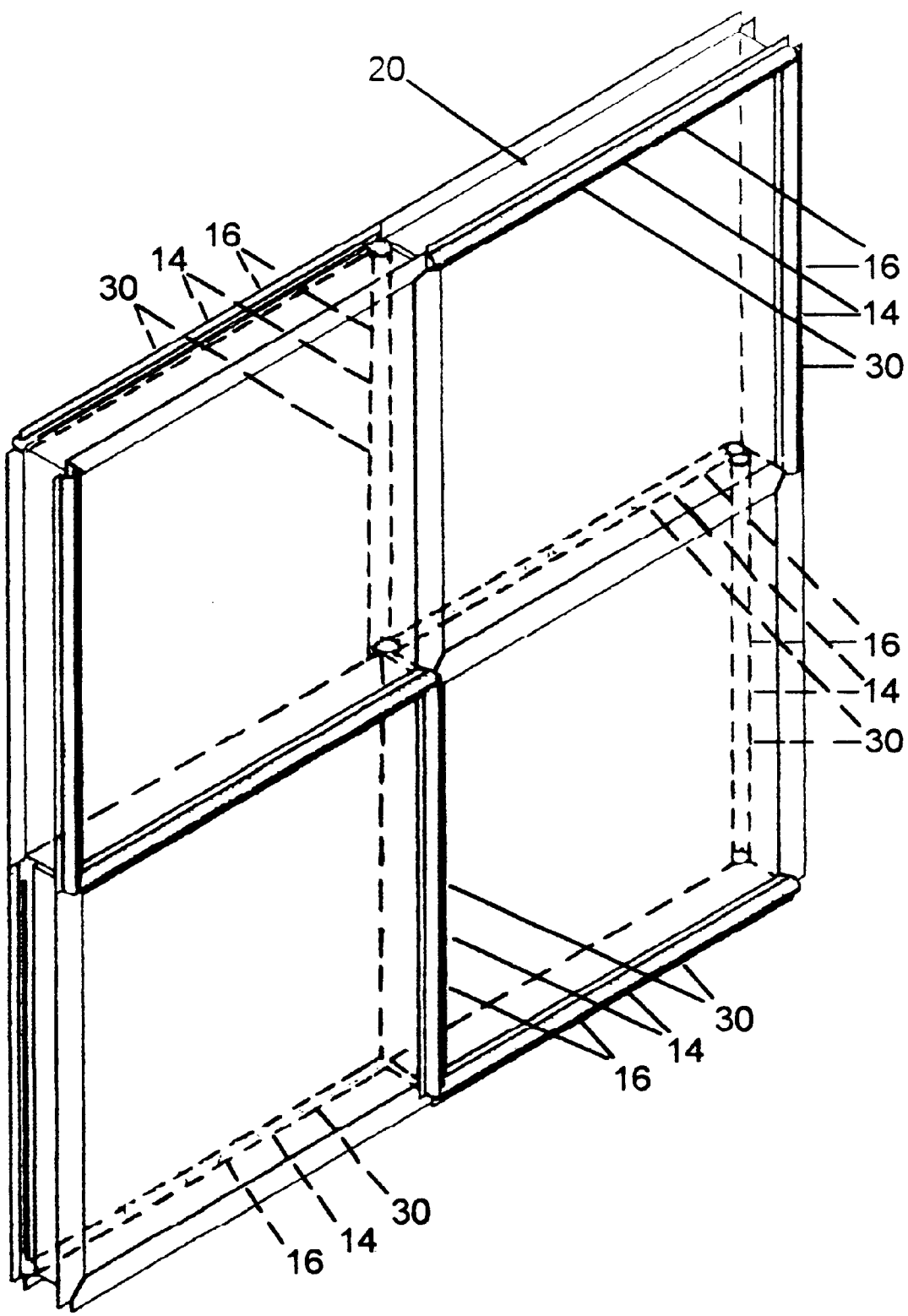
FIG. 6 is an isometric view of modules assembled with hinges arranged to allow bending without folding.

FIG. 6, shows several assembled modules 20. Hinges 30 are placed on the top and one side of the near face of each module 20 and on the bottom and the other side of its far face. Flaps 16 over each hinge 30 are welded to only one of the modules 20 at each joint.

The strips are joined to adjacent strips by hinges 30 on their sides. The position of hinges 30 on modules 20 with some thickness can induce folding in one direction only so that the structure can enclose a volume of liquid and the patterns of hinging the modules 20 can enable it to change form in ways to keep the volume constant, despite the rise and fall of the level of the surrounding liquid.

Figures 7A, 7B:
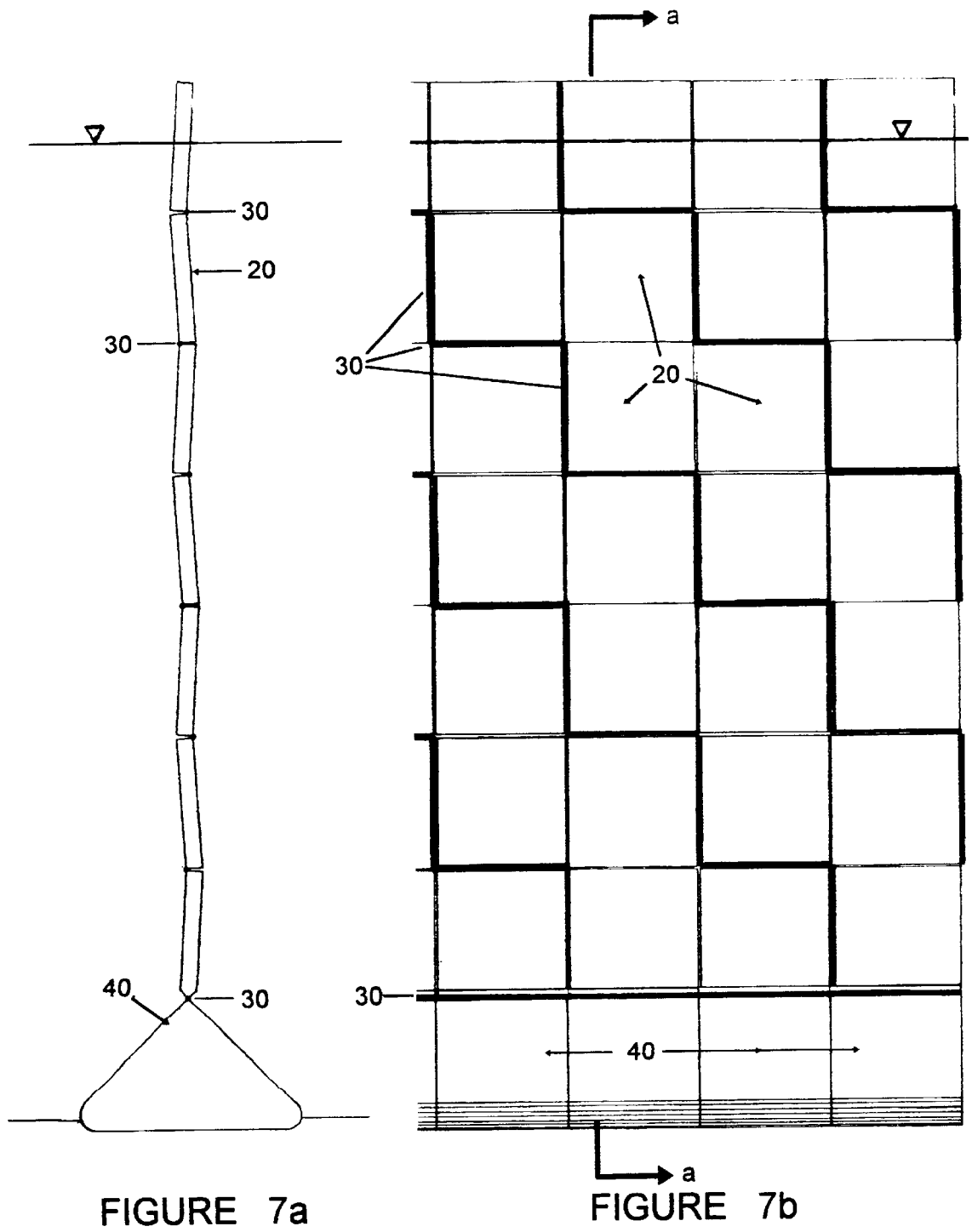
FIG. 7a is a cross-section along the line 7—7 in FIG. 7b
FIG. 7b is a partial elevation of the structure anchored on the bottom and stretching up to the surface with hinges arranged to allow limited bending, but not folding.

FIGS. 6, 7a and 7b show a pattern whereby the structure bends and moves slightly with motion in the liquid on either side, but retains the overall form of a vertical wall. Because of the thickness of the modules 20, they tend to only bend slightly on the side without the hinge 30 and do so on alternate sides, preventing the entire plane from folding in one direction.

Figure 7C:
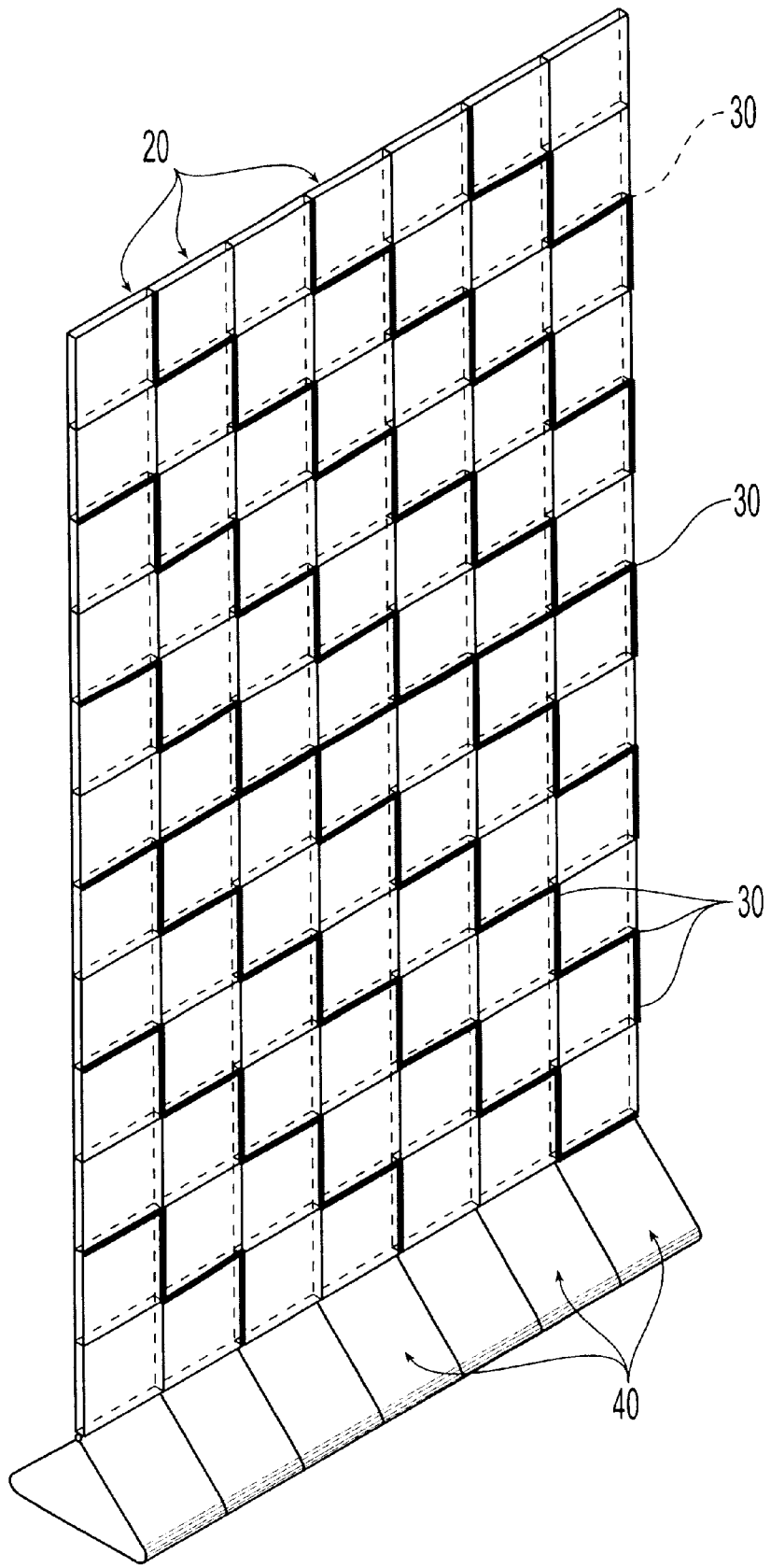
FIG. 7c is an isometric view of modules assembled in another embodiment to induce folding along certain lines.

FIG. 7c shows another pattern with some area having hinges 30 on alternating faces of the modules 20, but with continuous lines of hinges 30 on the near face extending all across its surface between specific points. These continuous lines permit folding on the side of the hinge 30. On the top folding joint, the hinges 30 are on the far face. Because the structure will fold easily in the direction of the hinge 30, this pattern will determine the movement of the structure when a larger force exists on one face than the other, such as when the tide ebbs. Then the structure will fold towards the viewer on the top line and away from the viewer on lower joints showing continuous hinges 30 on the near face.

Figure 7D:
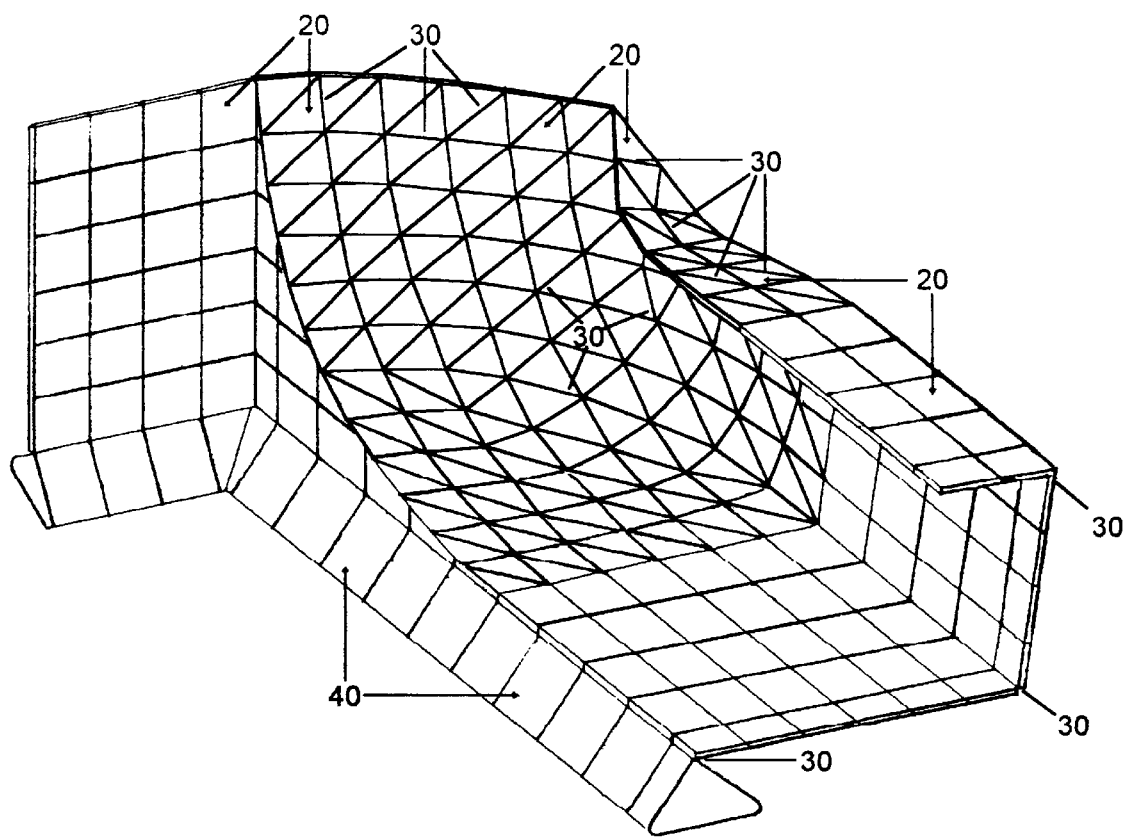
FIG. 7d is an isometric view of modules assembled in another embodiment to induce reversible folding along certain lines.

FIG. 7d shows another pattern with some areas having hinges 30 centered other edges of the modules 20. This enables the structure to fold in whichever direction from which the force comes. In the drawing, the modules in the corner of the walls are triangular and their edges are tapered so that they form a curved corner that gradually reverses its shape between high and low tides.

Each flexible structure must be engineered to operate according to the parameters of the particular site. The figures only show examples of possible configurations and do not limit the forms the invention can take.

Figure 8A:
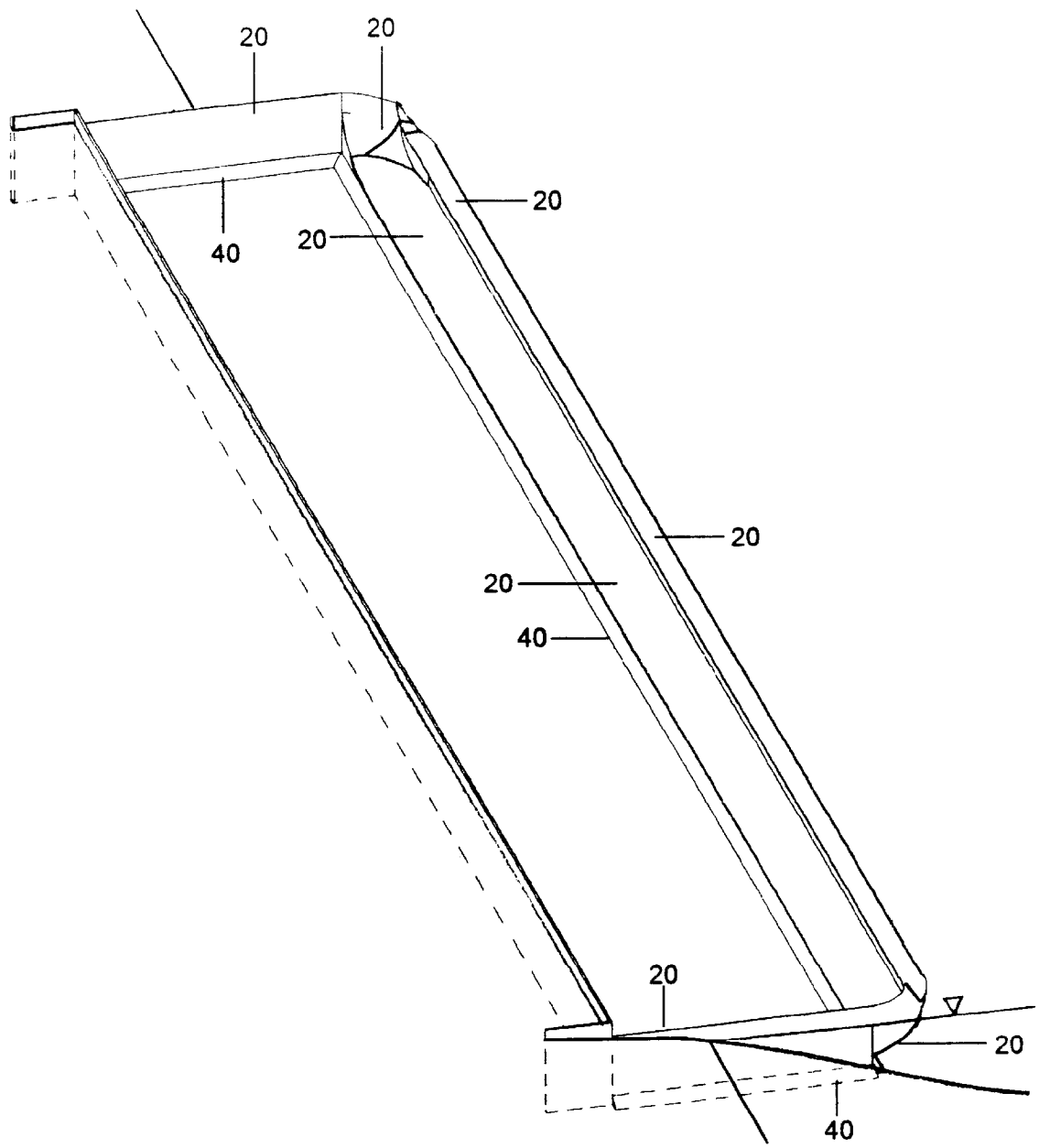
FIGS. 8a and 8b are isometric views of a body of water enclosed by the flexible structure.

FIG. 8a shows a volume of seawater enclosed by the structure at low tide, or freshwater at shallow depth. The surface of the surrounding water is at the line where the top modules 20 along the perimeter have folded over because the water is not high enough to float them, and the long side wall has swung outward, with the horizontal modules 20 stretching from their anchors seaward, and the corner concave towards the inside of the enclosure.

Figure 8B:
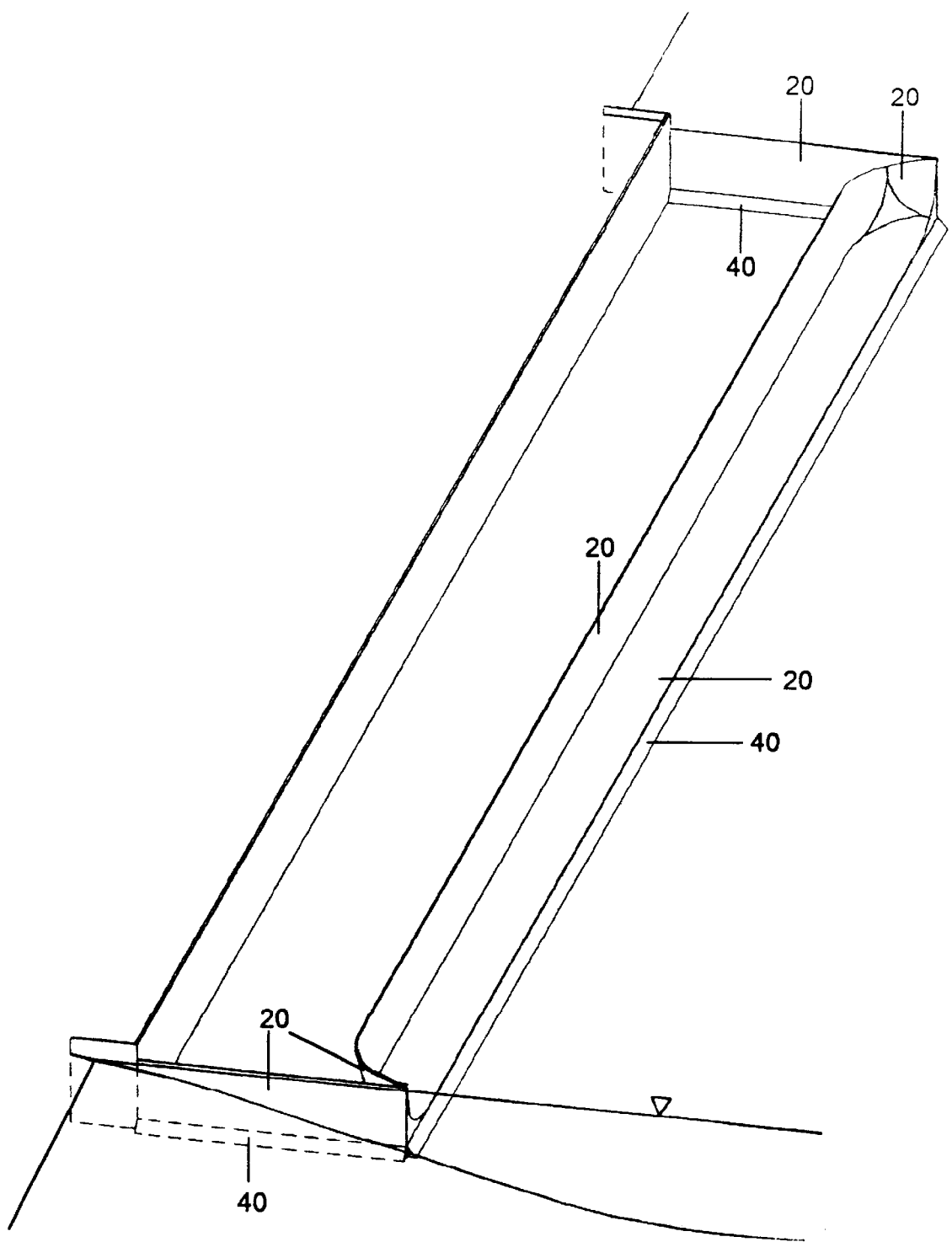

FIG. 8b shows what form the enclosing structure takes at high tide, or when flooding occurs. The rising water has lifted up the modules 20. The increasing outside pressure has swung the long side wall inward so that the corners are convex within the enclosure. The enclosed water level has risen gradually with the outside level. The water volume accommodated in reversing the wall from its inner to outer position is equal to the volume of the drop between high and low water levels. The movement prevents the water from being lost. At low level, it does not spill out; at flooding, or high tide, the sea does not pour in over the top. Instead, it raises the inside level by constricting its area.

Figure 9A:
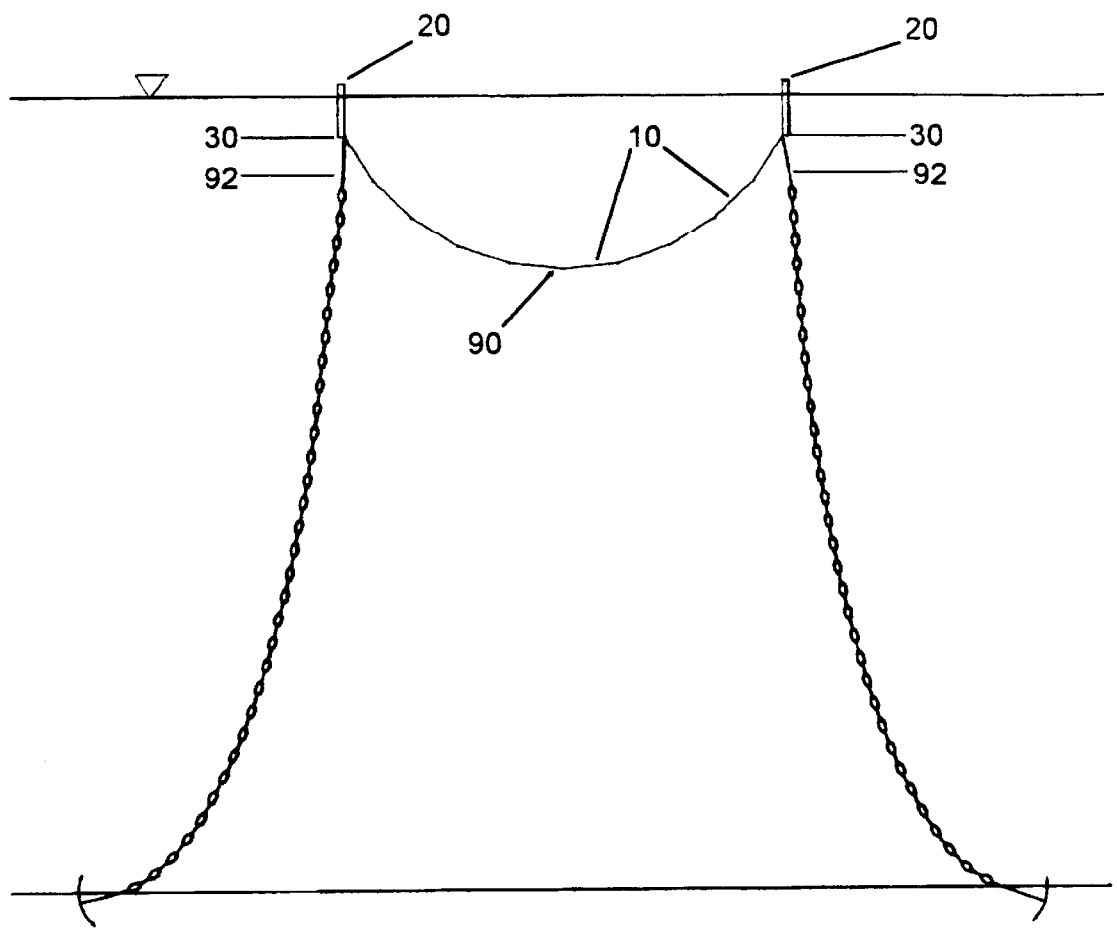
FIGS. 9a and 9b are cross-sections of floating enclosures anchored conventionally to the bottom.

FIG. 9a shows another embodiment of the structure 90 wherein the modular components may be single layer modules 10 enclosing the bottom of the body of water with foamed core modules 20 at the.upper perimeter of the enclosure providing buoyancy. Yokes 92 are connected by hinge pins 30 to the buoyant modules 20 and conventional anchor chains are secured to the yokes 92. In the preferred embodiment, the yoke members 92 are resilient but rigid tubes of nylon or polyvinyl chloride reinforced by a stainless steel plate at the connection to the chain. However, they may be any other non-corrosive material of adequate strength to resist forces to which they will be exposed.

Figure 9B:
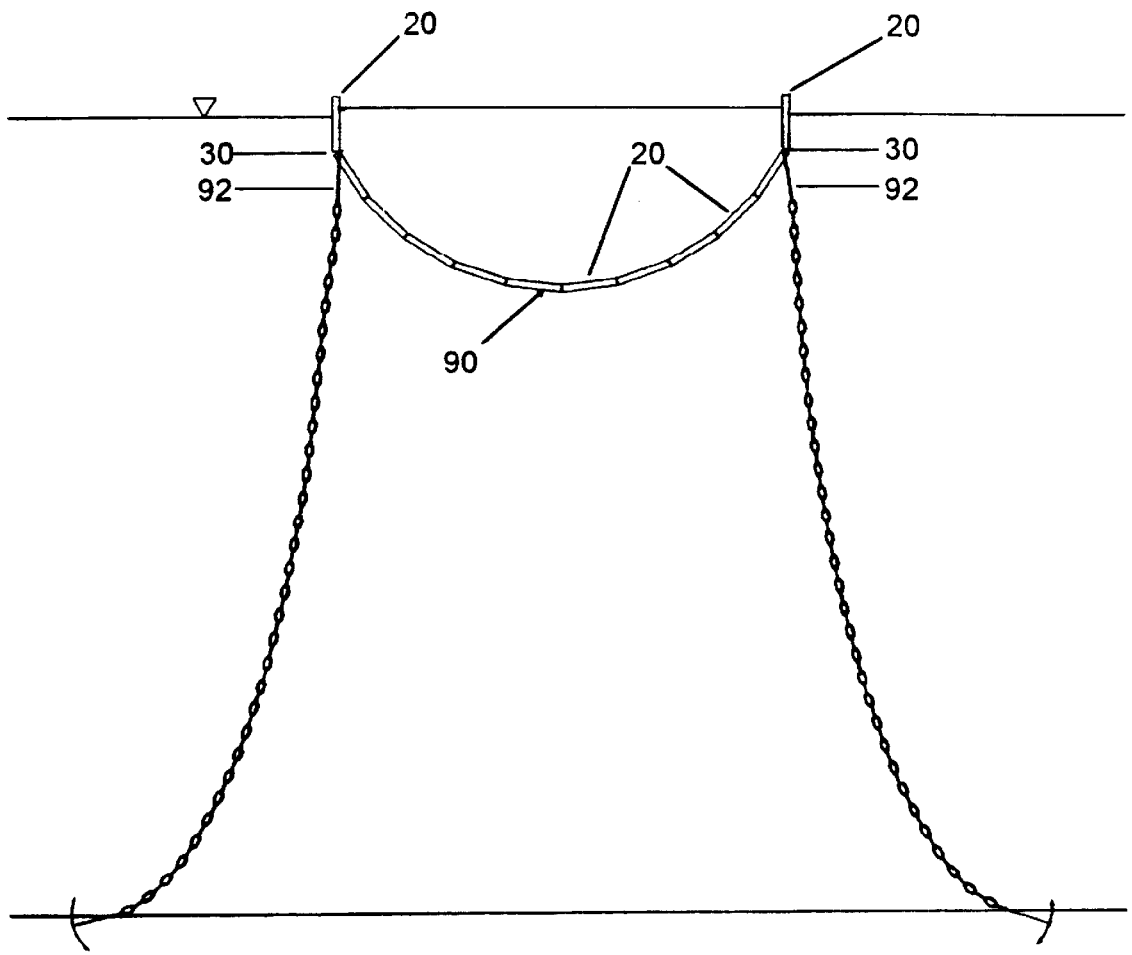

FIG. 9b shows another embodiment of the structure 90 as shown in FIG. 9a except that insulating modules 20 may be assembled throughout the enclosure.

In FIGS. 9a and 9b, the enclosures 90 may be either assembled on site or towed to the site fully assembled and anchored by suspending conventional anchors from the yokes 92 to the sea bottom. These structures 90 do not adjust their forms to the tides. Conventional filters (not shown) continually empty material that might weigh down the structure 90 to avoid placing a load on the joints beyond their capacity.

Figure 10A:
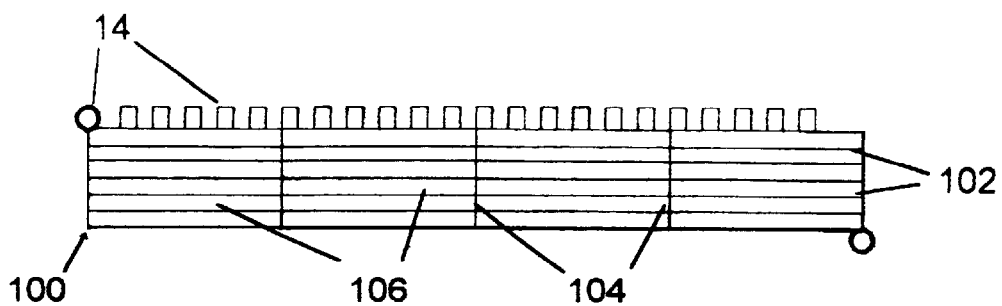
FIG. 10a is a cross-section along the line 10—10 in FIG. 10b which shows a floating mat module which has layers of gas tight compartments sealed between flexible transparent membranes.
Figure 10B:
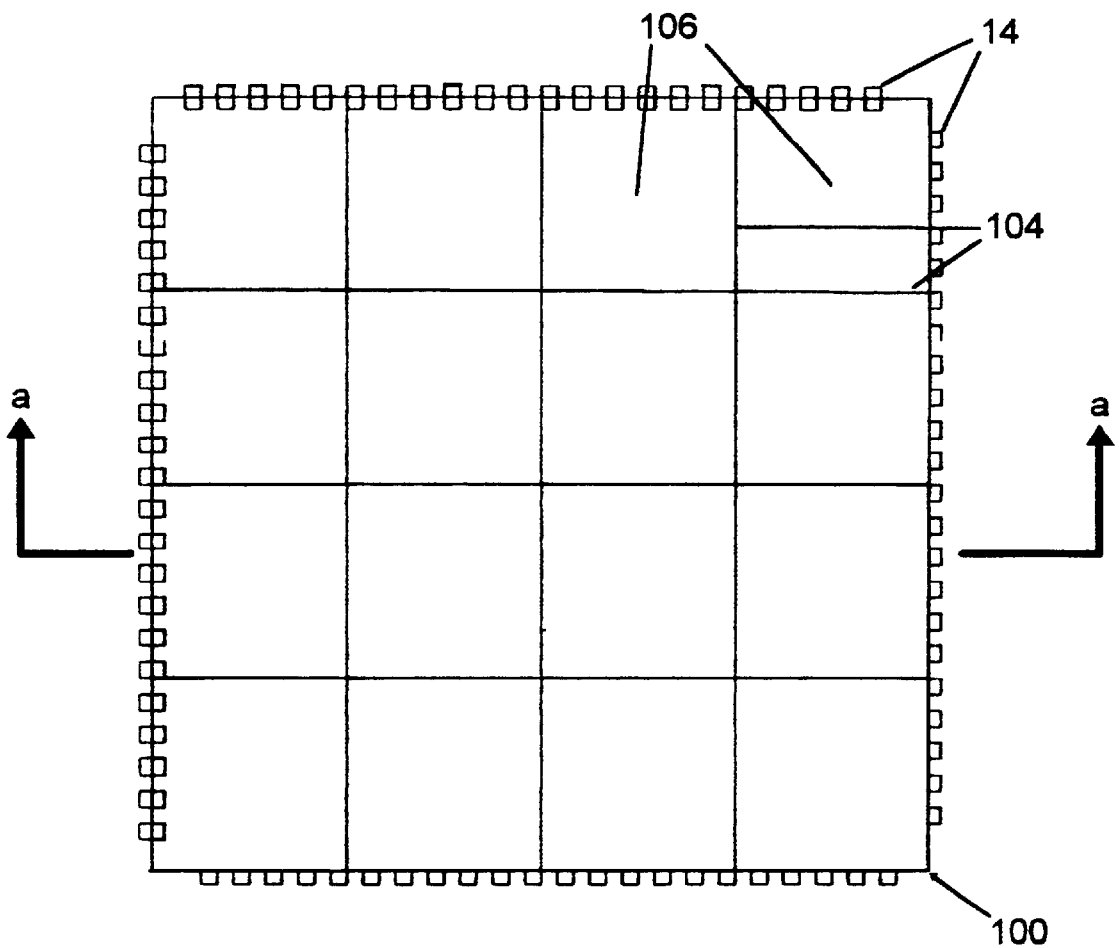

FIGS. 10a and 10b are a cross-section and plan of a floating mat module 100 which consists of flexible resilient transparent membranes 102 connected by ties 104 perpendicular to them to seal off gas tight compartments 106. Loops 14 on the edges are formed continuously from the same membrane 102, through which hinge pins 30 pass to connect the modules 100 together and to the enclosing structure. The membranes 102 and ties 104 may be polyethylene, nylon, polyester or polyolefin, selected for transmission of sunlight, strength and resistance to the liquid. Exterior membranes may be treated to resist organic growths and reinforced by fibers to withstand tensile and shear stresses.

The modules 100 are assembled into strips as long as can be conveniently handled, by joining them together by hinges 30 at their edges. Divers or workers in boats then float the strips over the site and join them to adjacent strips and to the top modules 20 of the enclosing structure. The hinges 30 are arranged to induce folding along lines to accommodate the movement of the enclosing structure during tidal changes. The floating mat insulates against transfer of heat between the liquid below and the air above. During the day, its transparency transmits ultraviolet and infrared sun rays so that the liquid achieves a net solar energy gain and is kept warm.

Figure 11A:
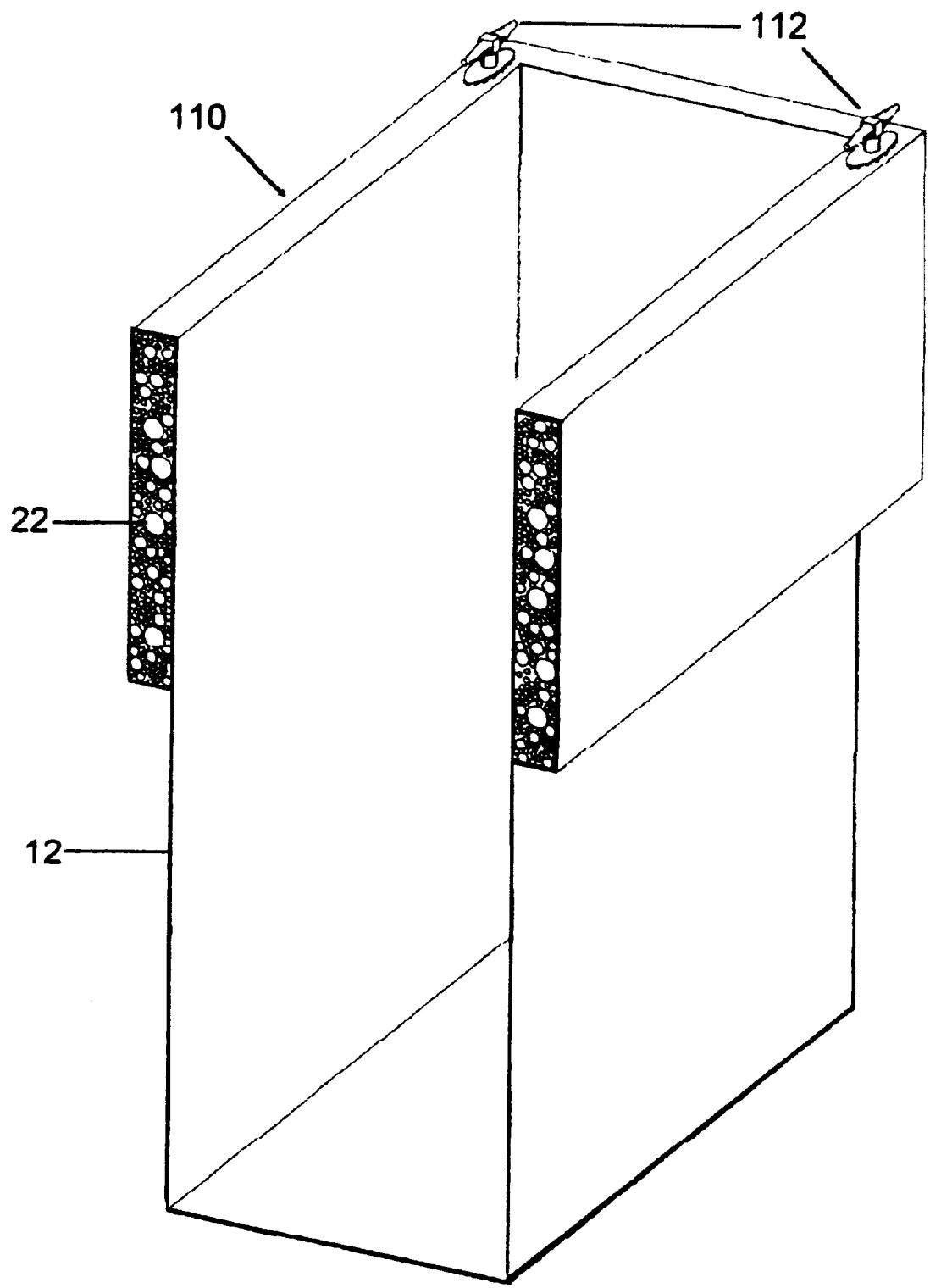
FIG. 11a is a partial isometric view of a floating structure made in one piece from a flexible membrane.

FIG. 11a is another embodiment showing a single piece structure 110 wherein a foamed core 22 provides buoyancy at the upper perimeter, but the enclosure is fabricated in one piece from a flexible membrane 12 with adhered joints. The top edges of the structure 110 have cleats 112 embedded into reinforced points in the membrane, to secure conventional lines and anchor chains (not shown). The cleats 112 are cast from polyvinyl chloride, nylon or any other rigid resilient non-corrosive material having adequate strength. The enclosure 110 can be towed to its site in one piece. This embodiment may enclose smaller volumes such as conventional filters and be secured to larger structures or anchored conventionally to the bottom.

Figure 11B:
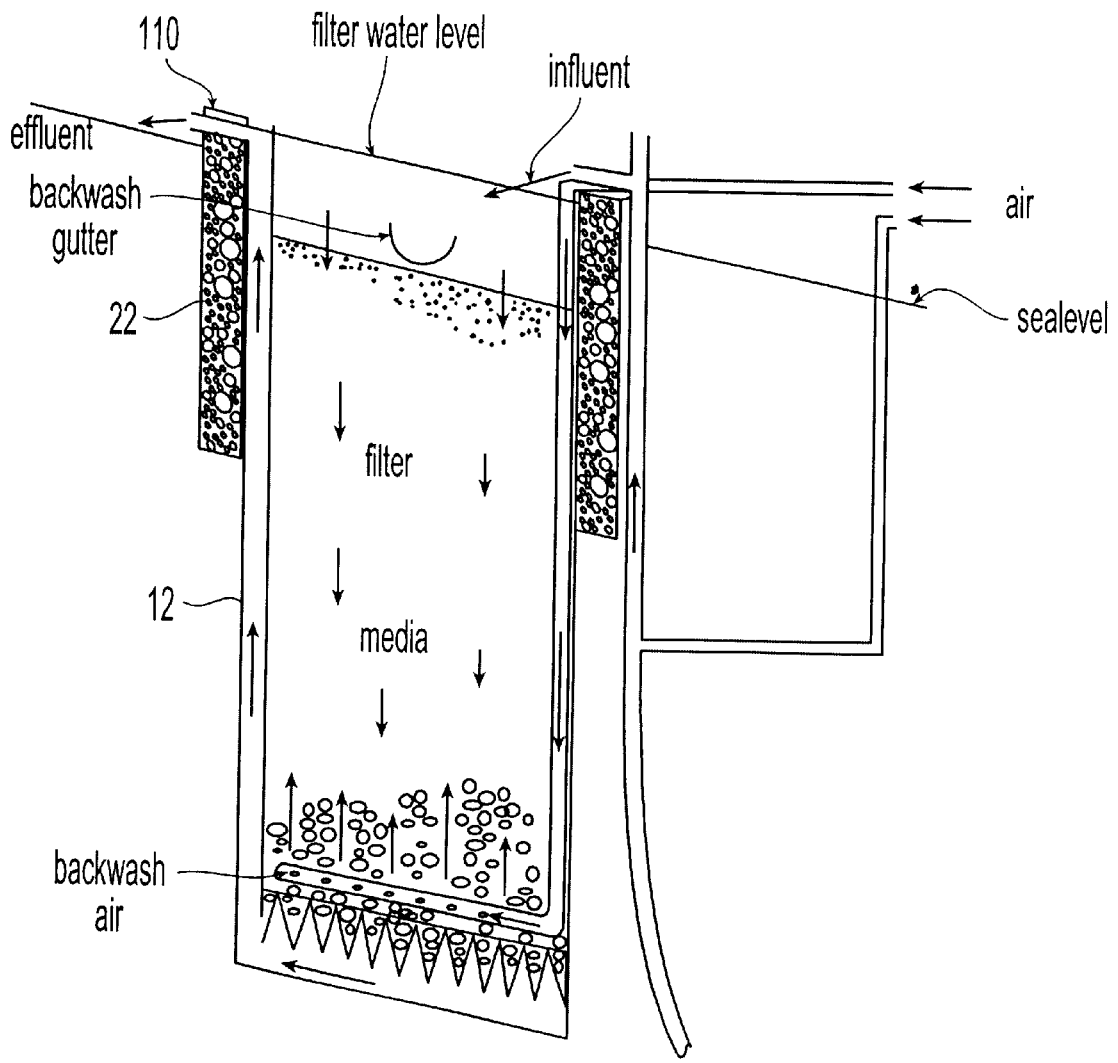
FIG. 11b is a cross-section of a conventional filter in a one-piece enclosure.

FIG. 11b shows a cross-section of a conventional filter in a one piece enclosure. In FIG. 11b, the polluted influent in a flexible tube is conventionally air lifted a few inches above a bed of filter media. It descends by gravity through the filter to return to the enclosed liquid. The fact that the filter floats maintains a constant and small head despite a large range between tides. This small unvarying head ensures efficient pumping. Then at high tides, the filter is backwashed conventionally by air sending accumulated waste down to a pipe fixed at a lower level.

Figure 12:
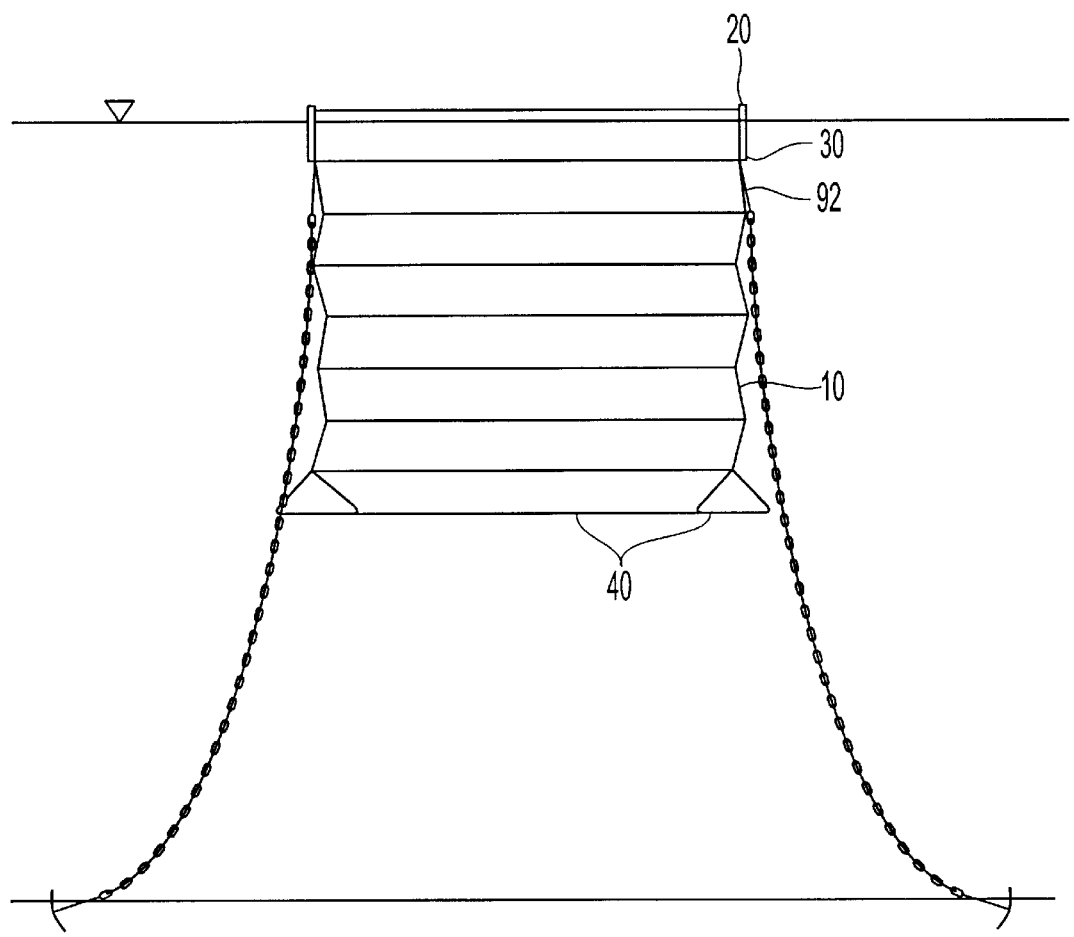
FIG. 12 is a cross-section of a floating partial enclosure, conventionally anchored to the bottom.

FIG. 12 shows a structure with an open bottom floating above the sea bottom. It is supported by buoyant modules 20 at its upper edge, suspended by anchor sacks 40 and anchored by conventional anchors to the bottom. In FIG. 12, the isolation is partial, separating only floating material from the other side of the structure and allowing fish, divers and bathers to swim in and out of the enclosure.

The reader will see that the flexible structure of this invention provides features that may be used to good advantage in a variety of applications. These include:

Convenient volume and mass to facilitate handling, transportation and floating;
Simple parts and their assembly facilitating installing, removal, repair and replacement by unskilled workers;
Ease of dismantling to encourage easier government agency approvals for.its use in near shore waters than for conventional rigid structures;
Anchoring methods that simplify positioning the structures;
Greater economy than conventional structures;
Inert material than renders it more durable than conventional structures;
Buoyancy and flexibility that simplify stress patterns and reduce the material needed to.resist them, further lowering the cost compared to rigid structures;
Hinges to avoid fatigue failure caused by repeated reverse bending;
Flaps over joints between impermeable modules, reducing seepage-so it cannot affect the liquid on the other side.
Single piece enclosures that provide complete isolation and separation and insure filter efficiency by maintaining a constantly low head on the pump;
Insulation against heat transfer through the structures;
Hinging methods to allow forms that adapt to varying water depths;
Adaptability to modifications to accommodate site conditions;
Flexibility that yields to impact and is safe for people, fish and boats;
Surfaces in various colors to absorb or reflect heat, to design visual effects for various esthetic or psychological purposes;
Control of water (or other liquid) quality to motivate uses that would otherwise be unfeasible in polluted or frigid water, such as:
  1. Urban/suburban aquaculture;
  2. Safe bathing;
  3. Urban/suburban diving trails;
  4. Underwater work or exploration.

Although the above description is quite specific in many details, these should not be construed to limit the scope of the invention, but instead as examples of its preferred embodiments. Many other variations are possible. For example, joints may be tied, structures may be buoyed by air or gas, the top may be covered by a floating mat that insulates against heat transfer by lets sunlight pass into the liquid, etc. For this reason, the scope of the invention should be determined not by the embodiments presented, but rather by the appended claims and their legal equivalents.

What is claimed is:

1. A particularly submerged structure for controlling the quality of liquids, comprising:

a plurality of flexible modules formed from a resilient impermeable membrane;
a plurality of buoyant modules;
connecting means for connecting said flexible and buoyant modules to each other to form said structure and
anchoring means for anchoring said modules to land so as to fix the structure in position,
wherein each of said plurality of flexible modules comprise a single layer of a resilient impermeable membrane having on certain edges, loops formed continuously from said membrane, and seal flaps of the same material adhered along certain edges;
wherein each of said plurality of buoyant modules is formed by two layers of said membrane sandwiching a buoyant foamed core, and adhered together at their edges, said buoyant modules having along certain edges loops formed continuously from said membrane and seal flaps of the same material adhered along certain edges;
wherein and said connecting means comprises a hinge pin passing through the loops and held in position by a nut on one end and a bolt head on the other.

2. The structure of claim 1, wherein said anchoring means comprises:
a plurality of sacks each comprising an impermeable membrane formed into a prism adapted to be filled with ballast, and having loops along a top edge formed continuously from said membrane; and
additional connecting means connecting said anchor sacks to said modules, said additional connecting means comprising hinge pins passing through said loops and held in position by a nut on one end and a bolt head on the other.

3. The structure of claim 1, wherein said anchoring means comprises at least one anchor chain connected at one end to a yoke connecting hinge pins on said buoyant modules and connected at an opposite end to an anchor.

4. The structure of claim 1, wherein said buoyant modules each have two spaced apart flat sides with said loops being disposed along an edge spaced from each side with the hinge pin extending alternately through loops of adjacent modules to facilitate limited pivotal movement of one module relative to an adjacent module in opposite directions.

5. The structure of claim 1, wherein said buoyant modules each have two spaced apart flat sides with said loops being disposed along an edge directly adjacent one side with the hinge pin extending alternately through loops of adjacent modules to facilitate pivoted movement of one module relative to an adjacent module in one direction only.

6. The structure of claim 1, including a floating mat for insulating against heat transfer while allowing sun light to radiate through it, comprising:
a plurality of interconnected flexible insulating modules each formed from a plurality of resilient transparent impermeable membranes connected to each other to define between them a plurality of layers of isolated gas tight compartments, and having on certain edges loops formed continuously from said membrane;
said insulating modules having a flexibility which permit them to be folded up for storage, installation, removal, and to adjust to changes in the area of enclosed liquid;
said resilient membranes having a transparency which transmits high amounts of ultraviolet and infrared sunrays;
said isolated gas tight compartments providing permanent insulation against transfer of heat between membranes, and therefore between the liquid below and the air above; and
additional connecting means for connecting said insulating modules to each other and to the structure enclosing the liquid, comprising hinge pins passing through said loops and held in position by a nut on one end and a bolt head on the other.

7. A partially submerged structure for controlling the quality of liquids, comprising:
a flexible resilient impermeable membrane formed into a single piece enclosure;
float means for floating the structure, comprising the said membrane wrapped around a buoyant core and joined to itself;
anchoring means for anchoring the structure so as to fix its position, whereby a liquid within the structure can be effectively separated from surrounding liquid, and
wherein said anchoring means for anchoring the structure is comprised of at least one cleat embedded in said buoyant core to which a line may be secured.

8. The structure of claim 7, wherein said anchoring means for anchoring the structure further comprises an anchor chain connected to said cleat and an anchor.

9. A method to control the quality of a liquid, comprising the steps of:
forming a plurality of modules from a resilient impermeable membrane;
assembling said modules into strips by joining their edges together;
delivering said strips of modules to the site;
floating said strips of modules on the liquid surface over their intended position;
extending and anchoring said strips tightly to the sea bottom; and
joining said strips together to define a substantial liquid enclosure,
wherein said method of joining said modules and strips is by passing hinge pins through loops on alternate modules and holding them in position by a nut on one end and a bolt head on the other.

10. The method of claim 9, wherein said method of anchoring is by filling a sack at the bottom of each strip with ballast, and positioning said anchor.

11. The method of claim 9, further comprising insulating the liquid by enclosing the liquid with a means to resist the transfer of heat.

12. The method of claim 9, further comprising heating the liquid by covering it with a floating mat made from transparent flexible membranes which transmit high amounts of ultraviolet and infrared sunrays while insulating against the transfer of heat out of the liquid.

* * * * *